US 8,988,899 B2

(12) United States Patent
Shinotsuka et al.

(10) Patent No.: US 8,988,899 B2
(45) Date of Patent: Mar. 24, 2015

(54) SWITCHING REGULATOR DEVICE

(75) Inventors: Sukeyuki Shinotsuka, Tochigi (JP); Claudio Yudi Inaba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 412 days.

(21) Appl. No.: 13/011,349

(22) Filed: Jan. 21, 2011

(65) Prior Publication Data
US 2011/0188271 A1 Aug. 4, 2011

(30) Foreign Application Priority Data

Feb. 3, 2010 (JP) ................................. 2010-022164

(51) Int. Cl.
H02M 3/156 (2006.01)
H02M 3/335 (2006.01)

(52) U.S. Cl.
CPC ................................. *H02M 3/335* (2013.01)
USPC ............................................. 363/17; 363/97

(58) Field of Classification Search
USPC ........ 323/282, 283, 284, 285; 363/15, 16, 17, 363/21.06, 21.09, 21.14, 21.17, 97, 127, 363/21.12, 21.13, 21.11, 39, 43, 26, 40, 41
See application file for complete search history.

(56) References Cited

U.S. PATENT DOCUMENTS

| | | | | |
|---|---|---|---|---|
| 5,155,672 A | * | 10/1992 | Brown | ............................. 363/43 |
| 5,884,233 A | * | 3/1999 | Brown | ............................. 702/61 |
| RE40,907 E | * | 9/2009 | Steigerwald et al. | ............ 363/39 |
| 7,764,516 B2 | * | 7/2010 | Yang | ........................... 363/21.06 |
| 2004/0136209 A1 | * | 7/2004 | Hosokawa et al. | ............. 363/24 |
| 2006/0158908 A1 | * | 7/2006 | Usui | .............................. 363/15 |
| 2007/0253228 A1 | * | 11/2007 | Morota et al. | ............. 363/21.12 |
| 2008/0002441 A1 | * | 1/2008 | Allinder | ..................... 363/21.14 |
| 2009/0180302 A1 | * | 7/2009 | Kawabe et al. | ............ 363/21.01 |
| 2011/0149616 A1 | | 6/2011 | Svardsjo | |

FOREIGN PATENT DOCUMENTS

| | | |
|---|---|---|
| JP | 07-059347 | 3/1995 |
| JP | 2679581 B2 | 8/1997 |
| JP | 10-052041 | 2/1998 |
| JP | 3399242 B2 | 4/2003 |
| WO | WO 2009/157819 A1 | 12/2009 |

OTHER PUBLICATIONS

Chinese Office Action dated Mar. 21, 2013, 12 pages.
Rejection Decision issued Jan. 14, 2014 and English translation.

* cited by examiner

*Primary Examiner* — Gary L Laxton
*Assistant Examiner* — Trinh Dang
(74) *Attorney, Agent, or Firm* — Squire Patton Boggs (US) LLP

(57) ABSTRACT

A switching regulator device including a power conversion transformer for converting an input voltage from a power source at a primary side to a predetermined output voltage and outputting the output voltage to a load circuit connected to a secondary side, a power converter circuit that has a primary-side circuit and a secondary-side circuit insulated from each other, and transmits a load driving control signal input to the primary-side circuit through the secondary-side circuit to the load circuit, and a feedback circuit that performs feedback control on the output voltage on the basis of feedback current generated at the primary side of the power conversion transformer, a part of the feedback current of the feedback circuit being consumed in synchronism with the load driving control signal.

7 Claims, 5 Drawing Sheets

SWITCHING REGULATOR DEVICE

INCORPORATION BY REFERENCE

The present application claims priority under 35 U.S.C. §119 to Japanese Patent Application No. 2010-022164 filed on Feb. 3, 2010. The content of the application is incorporated herein by reference in its entirety.

BACKGROUND OF THE INVENTION

1. Field of the Invention

The present invention relates to a switching regulator device, and particularly to a switching regulator device that has a power conversion transformer and supplies power to a load circuit under the state that a primary side and a secondary side are insulated from each other.

2. Description of the Related Art

There has been known a flyback type switching regulator device that has a flyback transformer as an insulation type switching power and supplies power to a load circuit under the state that a primary side and a secondary side are insulated from each other.

This flyback type switching regulator device is controlled so that an output voltage at the secondary side is monitored and feedback control is performed to output a predetermined voltage (for example, see Japanese Patent No. 2,679,581 and Japanese Patent No. 3,399,242).

The following three methods, etc. may be known as a feedback control method.

(1) A method of transmitting an output voltage (voltage information) at the secondary side to the primary side through an insulating element such as a photocoupler or the like, and using the output voltage for feedback.

(2) A method of detecting an output voltage by using a tertiary coil (feedback coil) and using the output voltage for feedback.

(3) A method of estimating an output voltage on the basis of a drain voltage (flyback voltage) of MOSFET to be switched and using the output voltage for feedback.

In the methods described above, according to the method indicated by (1), the output voltage is directly monitored and thus a predetermined output voltage can be output with high precision with respect to load variation at the secondary side. Conversely, in the case of a multi-phase output type switching regulator device, phases out of a phase being monitored cannot be controlled, and thus this method has a problem that cross-regulation occurs.

As compared with the method of (1), the method of (2) has a characteristic that no insulation device is required. However, the load of the feedback phase is constant and thus this method cannot follow load variation at the secondary side. Therefore, this method has a problem that cross-regulation occurs.

The method of (3) basically has the same problem as the method of (2).

The following is a cause of occurrence of the cross-regulation. A feedback phase (feedback system) out of plural output phases in the multi-phase output type switching regulator device is kept constant, and thus the other output phases cannot be controlled. That is, with respect to the multi-phase output type switching regulator device, each of the output phases cannot be individually controlled, and thus when the load condition varies, the output voltage also varies. Accordingly, there is a tendency that the output voltages of the other phases is higher than that of the feedback phase under a low load, and also there is a case where the output voltages are reduced under a high load.

Furthermore, a bleeder resistor is used at the feedback phase so that the same current as the current flowing at the output phase flows at the feedback phase. This bleeder resistor is used to consume power, and thus the power consumption is increased as a whole of the switching regulator device. Therefore, the bleeder resistor is a factor of causing reduction of the effective power conversion efficiency.

SUMMARY OF THE INVENTION

Therefore, an object of the present invention is to provide a switching regulator device that can reduce variation of an output voltage caused by load variation to stabilize the output voltage, and also enhance an effective power conversion efficiency.

In order to attain the above object, there is provided a switching regulator device comprising: a power conversion transformer that is supplied with an input voltage from a power source at a primary side, converts the input voltage to a predetermined output voltage and outputs the thus-converted output voltage to a load circuit connected to a secondary side; a power converter circuit that has a primary-side circuit and a secondary-side circuit insulated from each other, and transmits a load driving control signal input to the primary-side circuit through the secondary-side circuit to the load circuit; and a feedback circuit that performs feedback control on the output voltage on the basis of feedback current generated at the primary side of the power conversion transformer, wherein a part of the feedback current of the feedback circuit is consumed in synchronism with the load driving control signal. The switching regulator device may further comprise a coil that is provided at the primary side of the power conversion transform to detect the output voltage and generates the feedback current.

According to the above construction, the input voltage from the power source is input to the primary side of the power conversion transformer and converted to the predetermined output voltage. The thus-converted output voltage is output to the load circuit connected to the secondary side of the power conversion transformer.

The power converter circuit transmits the load driving control signal input to the primary-side circuit to the load circuit through the secondary-side circuit.

In parallel to this operation, the feedback circuit executes the feedback control on the output voltage on the basis of the feedback current generated by the coil provided to detect the output voltage at the primary side of the power conversion transformer, and a part of the feedback circuit is consumed in synchronism with the load driving control signal.

In the above switching regulator device, the power converter circuit may comprise insulating elements through which the load driving control signal is transmitted, and a part of the feedback current of the feedback circuit is supplied as operation power used when the insulating elements of the power converter circuit transmit the load driving control signal. The insulating elements may comprise any one of a photocoupler, a coupling capacitor and a coupling coil.

According to the above switching regulator device, the load driving control signal can be transmitted with keeping the insulation state between the primary-side circuit and the secondary-side circuit.

In the above switching regulator device, the feedback circuit may have a bleeder resistor for securing a current amount of the feedback current when the load circuit has a small load.

According to the above switching regulator device, even when the load of the load circuit is small, the current amount of the feedback current can be secured by the bleeder resistor.

In the above switching regulator device, the load circuit may have a plurality of switching elements that are subjected to PWM control, and a PWM control signal may be input as the load driving control signal to the power converter circuit.

According to the above switching regulator device, the power converter circuit transmits the input PWM control signal to the plural switching elements with keeping the insulation state between the primary-side circuit and the secondary-side circuit.

According to the present invention, apart of the feedback current of the feedback circuit is consumed in synchronism with the load driving control signal, and thus the current value of the feedback current varies in synchronism with the load variation state of the load circuit which is driven on the basis of the load driving control signal. Accordingly, the feedback current which accurately reflects the load variation state is obtained. As a result, the variation of the output voltage which is caused by the load variation of the load circuit can be reduced, and the output voltage can be stabilized.

Furthermore, according to the present invention, a part of the feedback current is consumed as the operation power when the insulating elements of the power converter circuit transmit the driving control signal, and thus the feedback current can be effectively used, so that the effective power conversion efficiency can be enhanced.

Still furthermore, according to the present invention, even when the load of the load circuit is small, the current amount of the feedback current can be secured by the bleeder resistor, and thus it can be prevented that the output voltage increases and thus the power consumption needlessly increases.

Still furthermore, according to the present invention, the load state of the load circuit is synchronized with and proportional to the PWM control signal as the load driving control signal, and thus the variation of the output voltage caused by the load variation of the load circuit can be surely reduced, so that the output voltage can be stabilized.

DETAILED DESCRIPTION OF THE PREFERRED EMBODIMENT

An embodiment according to the present invention will be described with reference to the accompanying drawings.

First, the basic principle of the present invention will be first described.

Figure 1:
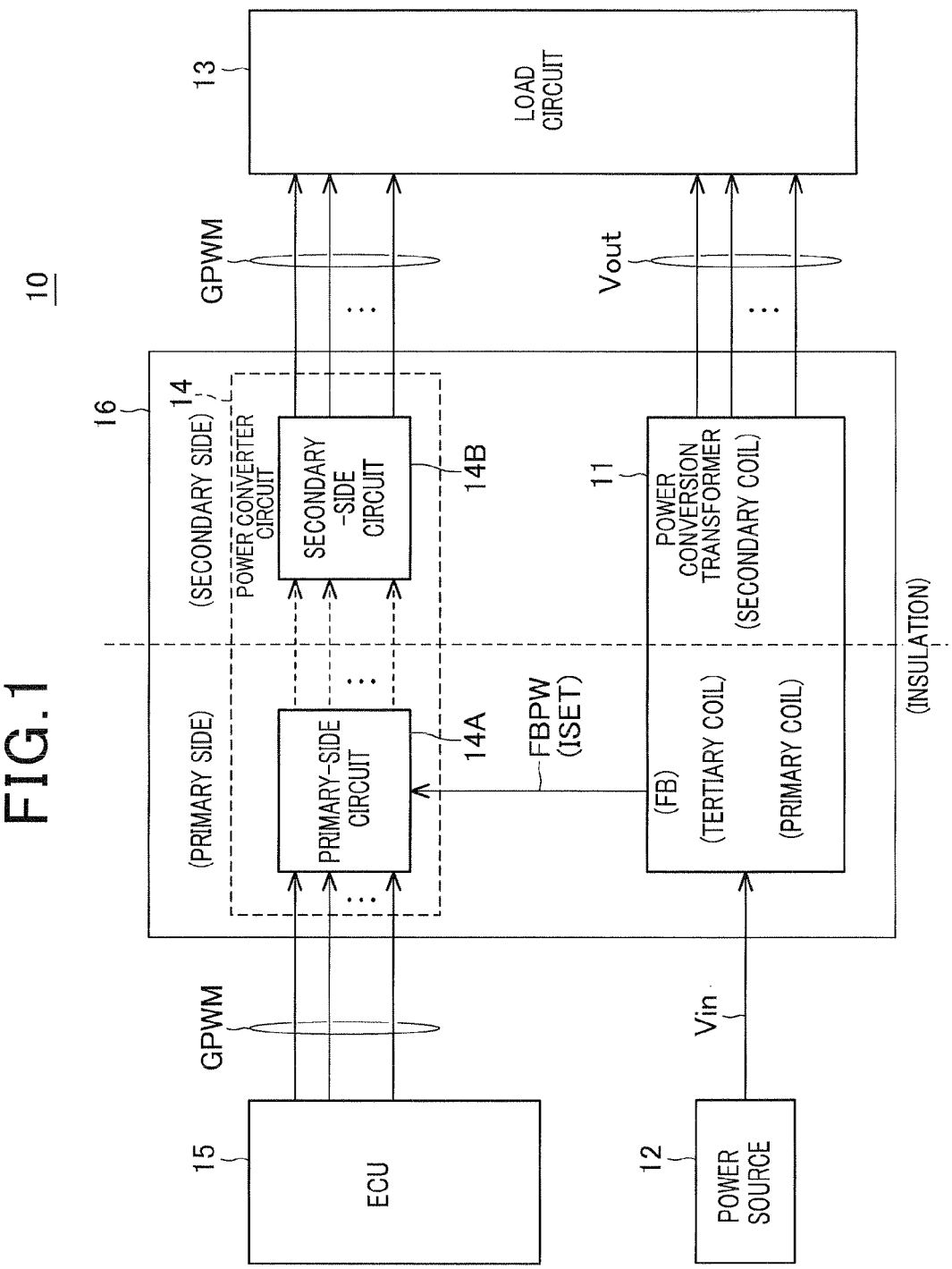
FIG. 1 is a block diagram showing the construction of an embodiment according to the present invention.

FIG. 1 is a block diagram showing the construction of a switching regulator device 10 of an embodiment of the present invention.

The switching regulator device has a power source 12, a load circuit 13, ECU (Electrical Control Unit) 15 mounted in a vehicle, and a power conversion/signal transmission circuit 16. The power conversion/signal transmission circuit 16 has a power conversion transformer 11 for converting an input voltage Vin at the primary side input from the power source 12 to a predetermined output voltage Vout, and then outputting the output voltage Vout to the load circuit 13 connected to the secondary side, and also a power converter circuit 14 for outputting a PWM (Pulse Width Modulation) control signal group GPWM as a load driving control signal input from ECU 15 to the load circuit 13 which is connected to the secondary side under insulation state.

The power conversion/signal transmission circuit 16 further has a power conversion circuit 17 (FIG. 3) for controlling the power conversion transformer 11 to perform power conversion.

The power conversion transformer 11 has a primary coil to which the input voltage Vin is input, and plural secondary coils for converting the input voltage Vin to the predetermined output voltage Vout in cooperation with the primary coil and outputting the output voltage Vout to plural systems. Furthermore, in order to stabilize the output voltage Vout output from the plural secondary coils to a predetermined voltage, the power conversion transformer 11 has a tertiary coil at the primary side so that inductive power caused by the output voltage Vout is generated in the tertiary coil. The voltage induced in the tertiary coil is internally detected, and the power induced in the tertiary coil is supplied as operation power FBPW from a feedback terminal FB to the primary side of the power converter circuit 14. The primary coil, the plural secondary coils and the tertiary coil will be described in detail later.

The power converter circuit 14 has a primary-side circuit 14A and a secondary-side circuit 14B. The primary-side circuit 14A transmits the PWM control signal group GPWM input from ECU 15 to the secondary-side circuit 14B under the insulation state, and the secondary-side circuit 14B outputs the PWM control signal group GPWM transmitted from the primary-side circuit 14A to the load circuit 13.

Figure 2:
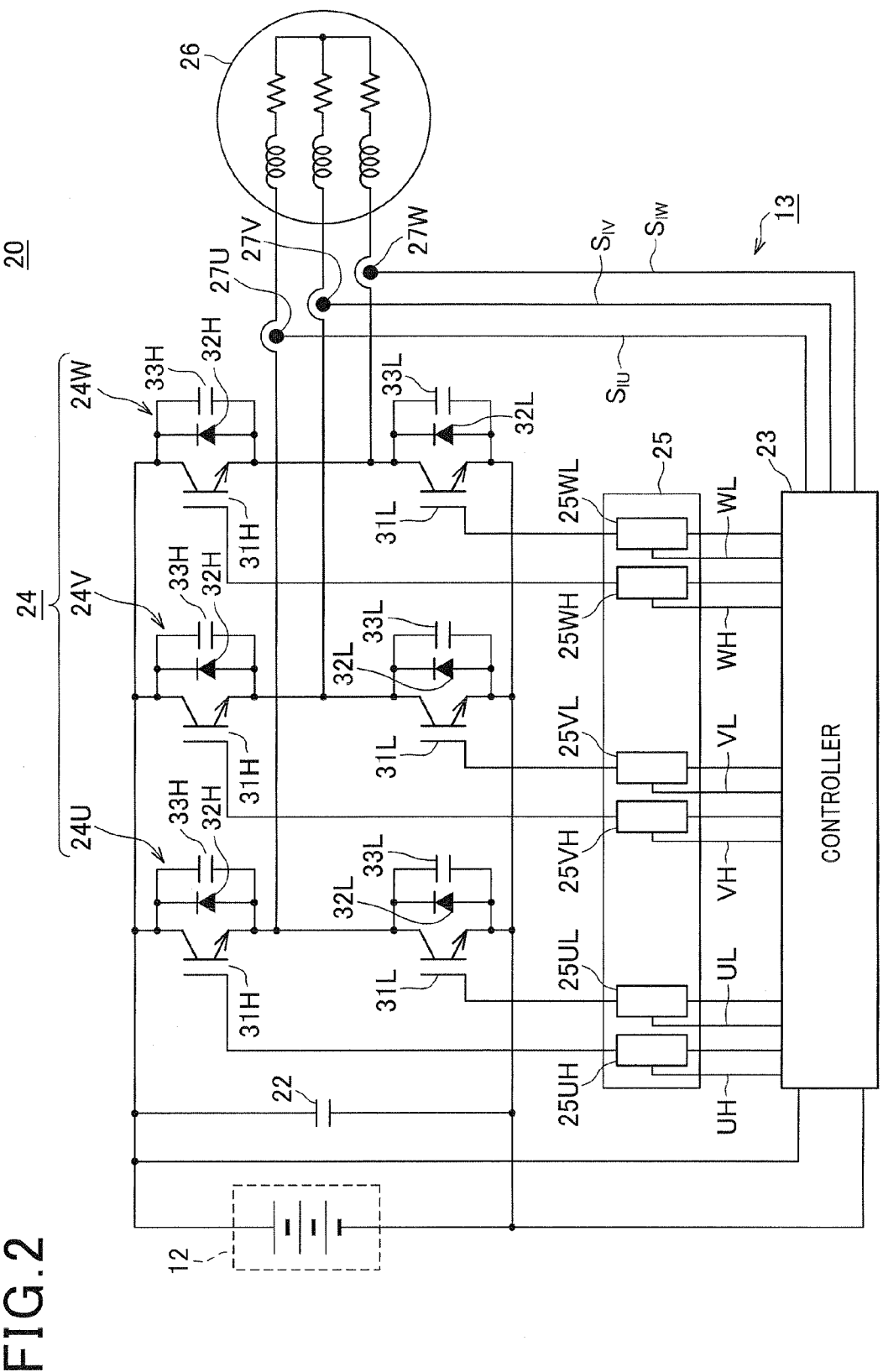
FIG. 2 is a diagram showing the construction of a motor driving device using a switching regulator device according to the embodiment.

FIG. 2 is a diagram showing the construction of a motor driving device using a switching regulator device according to the embodiment.

The motor driving device 20 is a device for driving an electric motor (three-phase AC motor 26 in this embodiment) in an electrical vehicle, a hybrid vehicle or the like, and it has a smoothing capacitor 22 for smoothing DC power supplied from the power source 12, a controller 23 for centrally controlling the motor driving device 20, an inverter circuit 24 having plural IGBTs (Insulated Gate Bipolar Transistors), an IGBT driver unit 25 for driving IGBTs constituting the inverter circuit 24, a three-phase AC motor 26 driven by the inverter circuit 24, and current sensors 27-U, 27-V and 27-W for detecting driving current of each phase of the three-phase AC motor 26. An in-vehicle mount battery corresponds to the power source 12.

The controller 23 is constructed as a microcomputer having MPU, ROM and RAM (not shown), for example. In this case, MPU of the controller 23 reads out a control program pre-stored in ROM, develops the read-out control program into a work area of RAM to execute the read-out control program, and executes various kinds of processing for controlling the respective parts of the motor driving device 20.

Furthermore, the controller 23 supplies the PWM control signal group GPWM to the load circuit 13.

The inverter circuit 24 has IGBT series circuits 24U, 24V, 24W each of which has two series-connected IGBTs, and the IGBT series circuits 24U, 24V, 24W are connected in parallel between the anode and cathode of the battery 21.

Here, the IGBT series circuits 24U, 24V and 24W are configured to have the same circuit construction, and thus the IGBT series circuit 24 will be described as an example.

The IGBT series circuit 24U has IGBT 31H constituting a positive-side arm, a diode 32H connected in parallel between the collect and emitter of IGBT 31H, a capacitor 33H connected in parallel between the collector and emitter of IGBT 31H, an IGBT 31L constituting a negative-side arm, a diode 32L connected in parallel between the collector and emitter of IGBT 31L, and a capacitor 33L connected in parallel between the collector and emitter of IGBT 31L.

Here, the gate of each of IGBTs 31H and 31L is connected to an IGBT driver unit 25.

The IGBT driver unit 25 has U-phase IGBT driving units 25UH, 25UL corresponding to the U-phase, V-phase IGBT driving units 25VH, 25VL corresponding to the V-phase and W-phase IGBT driving units 25WH, 25WL corresponding to the W-phase.

Here, the controller 23 outputs the corresponding PWM control signal UH to the U-phase IGBT driving unit 25UH, and also outputs the corresponding PWM control signal UL to the U-phase IGBT driving unit 25UL, thereby driving the IGBTs 31H, 31L corresponding to the U-phase.

Likewise, the controller 23 outputs the corresponding PWM control signal VH to the V-phase IGBT driving unit 25VH, and also outputs the corresponding PWM control signal VL to the V-phase IGBT driving unit 25VL, thereby driving the IGBTs 31H, 31L corresponding to the V-phase. Furthermore, the controller 23 outputs the corresponding PWM control signal WH to the W-phase IGBT driving unit 25WH, and also outputs the corresponding PWM control signal WL to the W-phase IGBT driving unit 25WL, thereby driving the IGBTs 31H, 31L corresponding to the W-phase.

The current sensors 27-U, 27-V, 27-W detect current flowing in the respective corresponding phases, and output current detection signals SIU, SIV, SIW to the controller 23.

In the above construction, the U-phase IGBT driving units 25UH, 25UL, the V-phase IGBT driving units 25VH, 25VL, the W-phase IGBT driving units 25WH, 25WL and the corresponding IGBTs 31H, 31L correspond to the load circuit 13 a whole.

Figure 3:
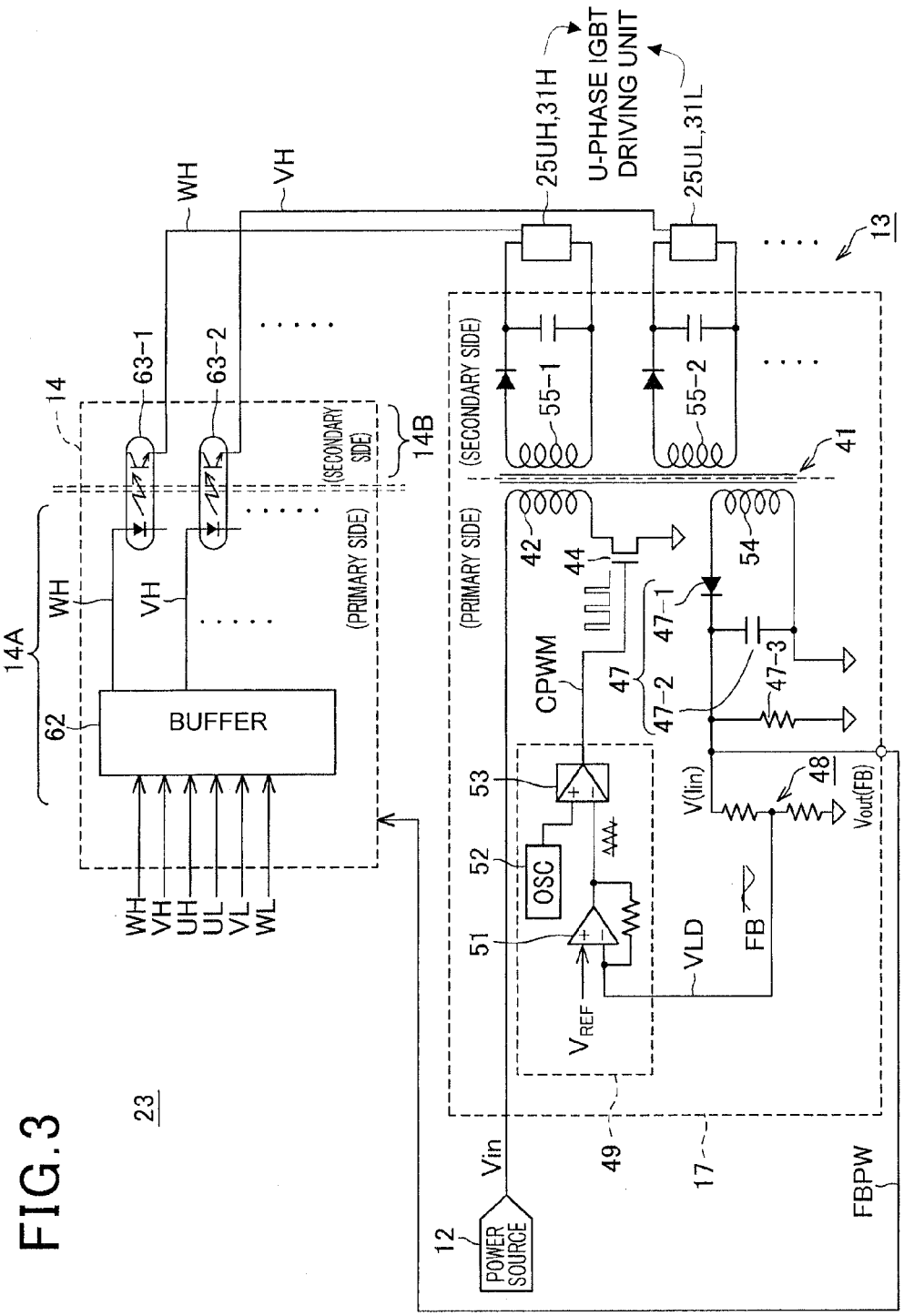
FIG. 3 is a block diagram showing the construction of a controller.

FIG. 3 is a block diagram showing the construction of the controller.

The controller 23 has a flyback transformer 41 (corresponding to the power conversion transformer of FIG. 1) which is supplied with power from the power source 12 to perform power conversion, a load current detector 47 which is connected to a tertiary coil 54 of the flyback transformer 41 and detects a voltage applied to the load circuit 13 at the primary side in a pseudo style, a voltage dividing circuit 48 which divides a voltage generated when a part of current flowing through the tertiary coil 54 is supplied to the voltage dividing circuit 48, and outputs the divided voltage as a voltage VLD to be used for power conversion control to stabilize the output voltage Vout, and a PWM controller 49 for performing PWM (Pulse Width Modulation) control as the power conversion control on the basis of the voltage VLD.

Here, the load current detector 47 and the PWM controller 49 constitute a feedback circuit.

The load current detector 47 has a diode 47-1 for preventing backflow current from flowing into the tertiary coil 54, a bypass capacitor 47-2 for removing an AC component of current flowing through the tertiary coil 54, and a bleeder resistor 47-3 for making predetermined current through the load current detector 47 so as to suppress increase of the output voltage Vout due to excessive reduction of the power at the primary side under the state that a low load is imposed on the load circuit 13.

Furthermore, the PWM controller 49 has an error amplifier 51 for amplifying the difference between the voltage VLD and a reference voltage VREF and outputting an error amplification signal, an oscillator (triangular wave generating circuit) 52 for generating a predetermined triangular wave for PWM control, and a comparator 53 for comparing the triangular wave signal output from the oscillator 52 with the error amplification signal and outputting a PWM control signal CPWM to the gate of a switching transistor 44 so that the switching transistor 44 executes a switching operation.

Furthermore, out of the current flowing through the tertiary coil 54, current other than the current flowing through the bleeder resistor 47-3 and the voltage dividing circuit 48 (that is, power other than the power consumed in the bleeder resistor 47-3 and the voltage dividing circuit 48) is supplied as operation power FBPW through the feedback terminal FB to the primary-side circuit 14A of the power converter circuit 14.

As shown in FIG. 3, the power converter circuit 14 has a buffer circuit 62 for buffering PWM control signals UH, UL, VH, VL, WH, WL input from ECU 15, and a photocoupler unit 63 having plural (six in this embodiment) photocouplers 63-1, 63-2, . . . which are respectively driven on the basis of the PWM control signals UH, UL, VH, VL, WH, WL output from the buffer circuit 62.

Figure 4:
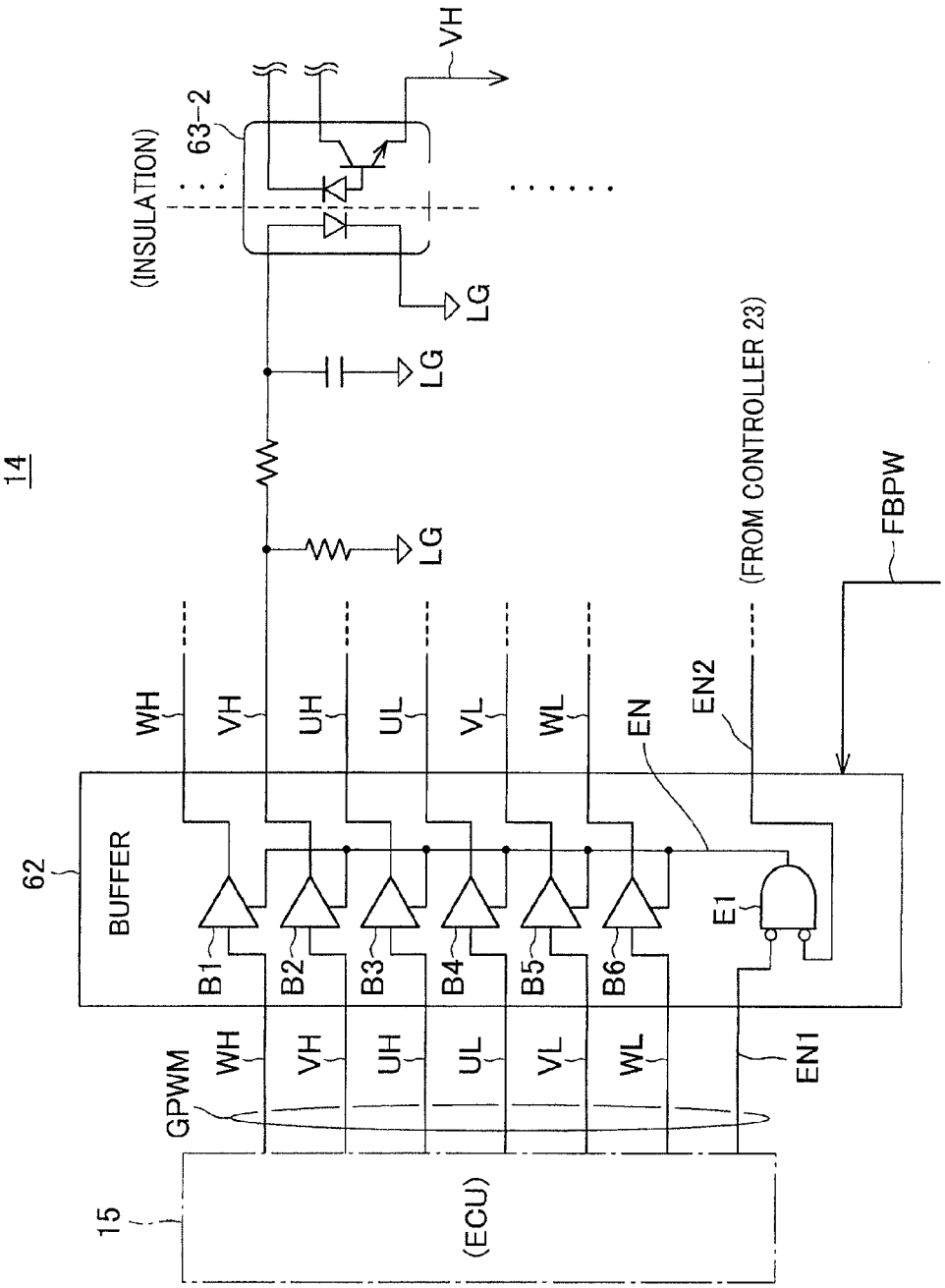
FIG. 4 is a diagram showing the detailed construction of a control signal transmission circuit.

FIG. 4 is a diagram showing the detailed construction of the power converter circuit.

The buffer circuit 62 has a buffer amplifier B1 to which the PWM control signal WH is input to amplify the PWM control signal WH with a predetermined gain and output the amplified PWM control signal WH, a buffer amplifier B2 to which the PWM control signal VH is input to amplify the PWM control signal VH with a predetermined gain and output the amplified PWM control signal VH, a buffer amplifier B3 to which the PWM control signal UH is input to amplify the PWM control signal UH with a predetermined gain and output the amplified PWM control signal UH, a buffer amplifier B4 to which the PWM control signal UL is input to amplify the PWM control signal UL with a predetermined gain and output the amplified PWM control signal UL, a buffer amplifier B5 to which the PWM control signal VL is input to amplify the PWM control signal VL with a predetermined gain and output the amplified PWM control signal VL, and a buffer amplifier B6 to which the PWM control signal WL is input to amplify the PWM control signal WL with a predetermined gain and output the amplified PWM control signal WL.

Furthermore, the buffer circuit 62 has an NOR circuit E1 which is supplied with a first output enable signal EN1 from ECU 15 and also with a second output enable signal EN2 from the controller 23. When both the enable signals EN1 and EN2 are set to "L" level, the NOR circuit E1 inputs an enable signal EN of "H" level to the enable input terminals of the buffer amplifiers B1 to B6 to allow the output of the PWM control signals UH, UL, VH<VL, WH, WL. The operation power FBPW is supplied to the respective buffer amplifiers B1 to B6 and the NOR circuit E1, and plural LEDs constituting the photocouplers 63-1, 63-2, . . . are indirectly supplied with the operation power FBPW through the respective buffer amplifiers B1 to B6. FIG. 4 shows only the photocoupler 63-2, however, the photocouplers 63-1, 63-3, . . . , 63-6 are connected to the respective buffer amplifiers B1, B3 to B6.

Accordingly, the operation power FBPW is supplied to the buffer amplifiers 31 to 36 and the plural LEDs (=primary-side circuit 14a) constituting the photocouplers 63-1, 63-2, etc.

The power consumption of the buffer circuit 62 and the power consumption of the plural LEDs of the photocouplers 63-1, 63-2, etc. correspond to the waveforms of the PWM control signals UH, UL, VH, VL, WH, WL, and thus they are proportional to (substantially synchronized with) the load variation of the secondary side, that is, the total load of the U-phase IGBT driving units 25UH, 25UL, the V-phase IGBT driving units 25VH, 25VL, the W-phase IGBT driving units 25WH, 25WL and the corresponding IGBTs.

Accordingly, the current ISET flowing through the feedback terminal FB follows (is substantially synchronized with) the load variation of the secondary side, and the current flowing through the tertiary coil 54 also follows (is substantially synchronized with) the load variation of the secondary side, so that the variation of the output voltage Vout can be suppressed.

Next, the operation of this embodiment will be described.

When the switching regulator device 10 is started, power is supplied from the power source 12 to the controller 23, and this power is supplied to the primary coil 42 of the flyback transformer 41. Accordingly, power is supplied to the tertiary coil 54 of the flyback transformer 41, and current flows through the load current detector 47, the voltage dividing circuit 48 and the feedback terminal FB.

By the power supplied to the flyback transformer 41 at the start time, the voltage dividing circuit 48 is supplied with a predetermined voltage which is defined in accordance with the load state of the bleeder resistor 47-3 and the primary-side circuit 14A, that is, a voltage under the state that the load circuit 13 executes a stationary operation. This voltage is divided in accordance with the voltage dividing ratio of the resistors constituting the voltage dividing circuit 48, and output as the voltage VLD to the PWM controller 49.

The error amplifier 51 of the PWM controller 49 amplifies the difference between the voltage VDL and the reference voltage VREF and outputs an error amplification signal to the inverting input terminal of the comparator 53. In parallel to this operation, the oscillator 52 generates a predetermined triangular wave signal for PWM control, and outputs the triangular wave signal to the non-inverting input terminal of the comparator 53.

The comparator 53 compares the triangular wave signal output from the oscillator 52 with the error amplification signal output from the error amplifier 51 to generate a PWM control signal CPWM, and outputs the PWM control signal CPWM to the gate of the switching transistor 44, whereby the switching transistor 44 executes a switching operation.

As a result, power of a predetermined voltage is supplied to the secondary coils 55-1, 55-2, . . . of the flyback transformer 41, and further supplied to the load circuit 13.

Furthermore, current ISET flowing from the feedback terminal FB through the primary-side circuit 14A of the power converter circuit 14 varies while following (is substantially synchronized with) the load variation of the secondary side, and the voltage VLD input from the voltage dividing circuit 48 to the error amplifier 51 varies while suffering an effect of the variation of the current ISET. Accordingly, the PWM control signal CPWM output from the comparator 43 varies while following the load variation of the secondary side, and thus the power corresponding to the load variation of the load circuit 13 is supplied to the secondary coils 55-1, 55-2, . . . of the flyback transformer 41.

Accordingly, a part of power which has been hitherto needlessly consumed by the bleeder resistor to control the output voltage of the flyback transformer 41 can be supplied as the operation power FBPW of the buffer amplifiers B1 to B6 and the plural LEDs constituting the photocouplers 63-1, 63-2, etc. which function as the primary-side circuit 14A, and thus the effective consumption power of the switching regulator device 10 can be reduced. Therefore, the power which is needlessly consumed as heat by the bleeder resistor can be effectively used by the primary-side circuit 14A, and thus the effective power conversion efficiency can be enhanced.

Furthermore, the operation power FBPW (and the current value ISET) supplied to the primary-side circuit 14A varies in proportion to (substantially synchronously with) the load state of the load circuit 13, and this variation is fed back to the power conversion circuit 17 and reflected to the power to be supplied to the secondary side of the flyback transformer 41. That is, the operation state of the load circuit 13 can be surely simulated at the power conversion circuit 17 side. Therefore, neither overshoot nor cross regulation occurs at the load circuit 13 side, and also there does not occurs such a disadvantage that the response speed is lowered. Furthermore, stabilization of the output voltage Vout can be enhanced.

In the foregoing description, the photocouplers are used as insulating elements which constitute the primary-side circuit 14A and transmit the PWM control signal as the driving control signal under the insulation state. However, the insulating elements are not limited to the photocouplers. For example, a coupling capacitor obtained by coupling capacitors, a coupling coil obtained by coupling coils, etc. may be used as insulating elements.

EXAMPLES

The construction of this embodiment will be described in more detail by using some examples.

The actual circuit is constructed by a minimum of parts, and thus it is unnecessary to strictly match the load of the primary side with the load of the secondary side from the viewpoint of the increase of the number of parts and the cost performance.

For example, when the load of the actual circuit is as follows:

(1) consumed power of the gate driving circuit of the secondary side (under non-driving state of IGBT gate): about 10 mA, (2) consumed power of the gate driving circuit of the secondary side (under driving state of IGBT gate): about 30 mA, (3) consumption current of the photocouplers of the primary side=about 5 mA×6 phases: about 24 mA, and (4) consumption current of the other primary-side circuits: about 1 mA, the consumption current of the primary side varies in the range from 1 to 25 mA, and the consumption current of the secondary side varies in the range from 10 to 30 mA.

With respect to the switching power source using the flyback transformer, when the load is small (in the above case, the consumption current of the primary side is less than 10 mA), the output voltage Vout increases although the consumption current of the second side is not so high. In order to avoid this phenomenon, it is necessary to make the requisite minimum of load current flow, and current balance is established by providing a bleeder resistor (corresponding to the bleeder resistor 47-3 of FIG. 3 in this embodiment) so that at least some degree of current (in the above case, about 10 mA) is made to flow.

Even when such a construction is adopted, the power which is needlessly consumed can be reduced and thus the effective power consumption can be reduced as compared with the case where all the current flowing through the tertiary coil 54 is converted to heat and consumed by the bleeder resistor as the perfectly fixed load.

Figure 5A:
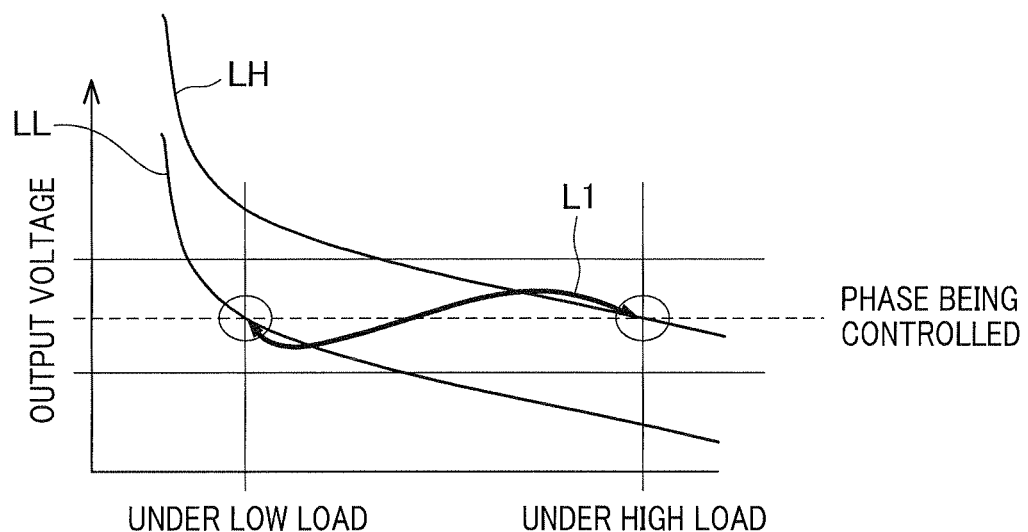
FIGS. 5A and 5B are diagrams showing the relationship between a load state of a load circuit and variation of an output voltage.
Figure 5B:
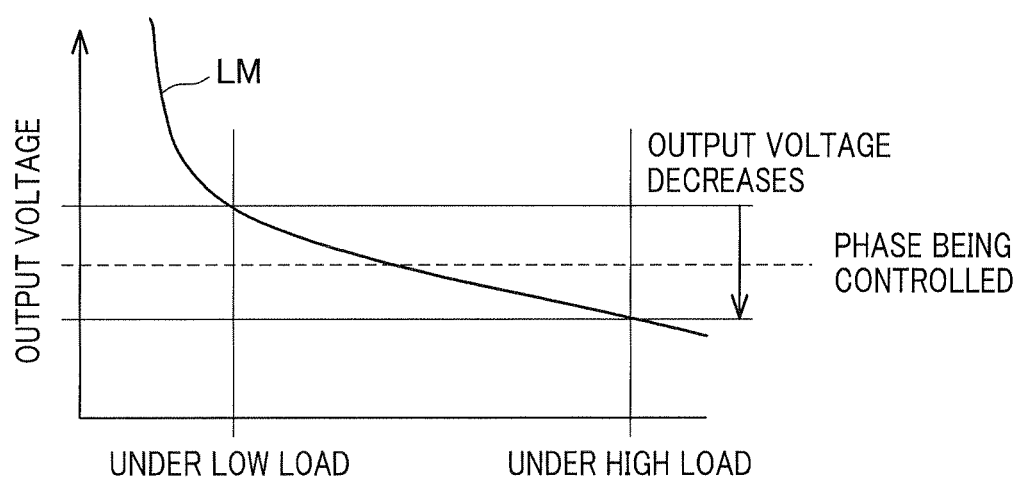

FIGS. 5A and 5B are diagrams showing the relationship between the load state of the load circuit and the variation of the output voltage.

In FIG. 5A, the output voltage of a phase which is perfectly controlled on the basis of the feedback current flowing through the tertiary coil 54 is represented by a broken line, a phase whose output voltage Vout is higher than that of the phase being controlled is represented by reference character LH, and a phase whose output voltage is lower than that of the phase being controlled is represented by reference character LL.

In the construction of this embodiment, the load of the feedback varies while following the variation of the secondary-side load. Therefore, as indicated by reference character L1 in FIG. 5A, the voltage variation of the output voltage can be reduced. As indicated by reference character L1, as compared with the phase which is perfectly controlled on the basis of the feedback current, it is clear that the variation range of the voltage variation can be more greatly reduced as compared with the voltage variations of the phase (reference character LH) whose output voltage Vout is higher and the phase (reference character LL) whose output voltage Vout is lower although the output voltage varies In FIG. 5B, the output voltage when all the current flowing through the tertiary coil is consumed by the bleeder resistor as a perfectly fixed load is represented by reference character LM. With respect to the output voltage of the reference character LM, the output voltage under the high load of the load circuit 13 is more greatly reduced as compared with the output voltage under the low load of the load circuit 13. As compared with the variation of the output voltage of the reference character LM, the voltage variation of the output voltage of this embodiment (reference character L1 of FIG. 5A) is smaller. That is, according to this embodiment, a more stable output voltage Vout can be obtained as compared with the conventional construction.

What is claimed is:

1. A switching regulator device, comprising:
a power conversion transformer that is supplied with an input voltage from a power source at a primary side, converts the input voltage to a predetermined output voltage and outputs the predetermined output voltage to a load circuit connected to a secondary side;
a power converter circuit that has a primary-side circuit and a secondary-side circuit insulated from each other, and receives a load driving control signal comprising a Pulse Width Modulation (PWM) control signal from an external device and transmits the load driving control signal from the primary-side circuit through the secondary-side circuit to the load circuit; and
a feedback circuit that detects the output voltage at the secondary side of the power conversion transformer, generates a feedback current at the primary side of the power conversion transformer on the basis of the detected output voltage, divides the feedback current into a first part and a second part, and performs a feedback control on the output voltage based on the first part of the feedback current, and a feedback terminal that supplies the primary-side circuit of the power converter circuit with the second part of the feedback current as an operation power varying substantially synchronously with a load state of the load circuit.

2. The switching regulator device according to claim 1, wherein the feedback circuit has a coil that is provided at the primary side of the power conversion transformer to detect the output voltage and generates the feedback current.

3. The switching regulator device according to claim 1, wherein the power converter circuit comprises insulating elements through which the load driving control signal is transmitted from the primary-side circuit to the secondary-side circuit with, and the second part of the feedback current of the feedback circuit is supplied as the operation power used when the insulating elements of the power converter circuit transmit the load driving control signal.

4. The switching regulator device according to claim 1, wherein the feedback circuit has a bleeder resistor for securing a current amount of the feedback current when the load circuit has a small load.

5. The switching regulator device according to claim 1, wherein the load circuit has a plurality of switching elements that are subjected to PWM control.

6. The switching regulator device according to claim 3, wherein the insulating elements comprise any one of a photocoupler, a coupling capacitor and a coupling coil.

7. The switching regulator device according to claim 2, wherein the feedback circuit further comprises a load current detector that is connected to the coil and detects the output voltage applied to the load circuit at the primary side in a pseudo style, a voltage dividing circuit that is connected to the load current detector, and divides a voltage generated when a part of current flowing through the coil is supplied to the voltage dividing circuit and outputs a divided voltage as a voltage to be applied for power conversion control to stabilize the output voltage, and a PWM controller that is connected to the voltage dividing circuit and performs PWM (Pulse Width Modulation) control as the power conversion control on the basis of the voltage.

\* \* \* \* \*